2,765,216
PRODUCTION OF MONOPERPHOSPHORIC ACID

Edward W. Heiderich, Lewiston, N. Y., assignor to E. I. du Pont de Nemours and Company, Wilmington, Del., a corporation of Delaware No Drawing. Application October 9, 1953,
Serial No. 385,270

6 Claims. (Cl. 23—165)

This invention relates to the preparation of percompounds, particularly monoperphosphoric acid.

Schmidlin et al., Ber. 43, 1162 (1910), and D'Ans et al., Ber. 43, 1880 (1910), have reported the production of monoperphosphoric acid, $H_3PO_5$, by the reaction of phosphorus pentoxide with aqueous hydrogen peroxide according to the equation:

$$P_2O_5 + 2H_2O_2 + H_2O = 2H_3PO_5$$

However, carrying out the reaction as described employing the usual commercial phosphorus pentoxide is dangerous because of the great reactivity of the phosphorus pentoxide. The present invention relates to an improved method for carrying out the above reaction.

It is an object of the invention to provide an improved method for preparing monoperphosphoric acid. A particular object is to provide an improved method for reacting phosphorus pentoxide with aqueous hydrogen peroxide. A still further object is to provide a method for separating unreacted hydrogen peroxide from the mixture resulting from the reaction of phosphorus pentoxide with aqueous hydrogen peroxide. Still further objects of the invention will be apparent from the following description.

The above objects are accomplished in accordance with the invention by reacting aqueous hydrogen peroxide with phosphorus pentoxide which has been heated at an elevated temperature sufficiently to reduce substantially its reactivity. In a preferred embodiment of the invention, the resulting mixture containing the desired monoperphosphoric acid is subjected to a low temperature vacuum distillation so as to remove therefrom any unreacted hydrogen peroxide that may be present.

Ordinary commercial phosphorus pentoxide reacts vigorously with water and with aqueous hydrogen peroxide, making its use in the method of Schmidlin et al dangerous. Schmidlin et al obviously employed the ordinary pentoxide in their work for they emphasize the necessity of employing the reactants in small increments while strongly cooling the reaction mixture. It has now been found that the hazards incurred when using ordinary commercial phosphorus pentoxide can be avoided or largely overcome by employing phosphorus pentoxide which has been heated to reduce its reactivity. Thus, pentoxide which has been heated to 450° C. dissolves rather quietly and slowly in water, and very slowly in 90% aqueous hydrogen peroxide. Because of its lesser reactivity, use of heat-treated instead of ordinary commercial phosphorus pentoxide in the method of Schmidlin et al, makes the production of monoperphosphric acid much more practical.

The phosphorus pentoxide to be used in practicing the invention can be heated in any desired manner which will effect a substantial reduction in its reactivity. Heating in a closed vessel is preferred. Temperatures of 350 to 700° C. are advantageously employed, those in the range 400 to 500° C. being preferred. The time required to effect the desired reduction in reactivity will depend upon the temperature used, shorter times being required at higher than at lower temperatures. At temperatures in the above range, a substantial reduction in reactivity will be realized in times as short as one hour, but a somewhat longer heating period is advantageous, e. g. 4 to 24 hours or longer, and preferably 12 to 18 hours. The heating can be carried out at any desired pressure, atmospheric pressure or higher being usable, but it is preferred to employ reduced pressures, e. g. pressures less than about 10 mm. of mercury.

The invention is illustrated by the following examples. In the examples and elsewhere in the specification, all percentages given are percentages by weight and all parts represent parts by weight.

Example 1

5.7 parts of ordinary commercial phosphorus pentoxide was heated for 16 hours at 500° C. in a tube evacuated to around 10 mm. or less of mercury. After cooling to room temperature, there were added to the phosphorus pentoxide 2.7 parts of 90% aqueous hydrogen peroxide and 2 parts of distilled water. The mixture was stirred at 10° C. for 36 hours, filtered through a porous glass filter, then diluted with about 200 parts of distilled water. Analysis of the resulting solution by the iodine-thiosulfate method showed that it contained 0.8 part of active oxygen. Half, 0.4 part, of this active oxygen was present as $H_2O_2$ as determined by titration with ceric ammonium sulfate, the remaining 0.4 part being present as monoperphosphoric acid.

Example 2

To 2.7 parts of 90% aqueous hydrogen peroxide in a glass tube held in a bath at 24° C., there was added 10 parts of phosphorus pentoxide which had previously been heated in an evacuated closed vessel at 450° C. for 18 hours. The pentoxide was added in five equal increments over a period of 2.5 hours with stirring which was continued for an additional 18 hours. The tube was then evacuated to allow the volatile material, including unreacted $H_2O_2$, to distill out at room temperature, the distilled material being condensed in a cold trap. When stripping of volatile materials appeared to be complete, the residual material in the tube was dissolved in about 200 parts of distilled water and the solution was filtered to remove traces of suspended solids. Analysis of the resulting solution showed that it contained 0.27 part of active oxygen, all of which was present as monoperphosphoric acid. The volatile material which was stripped out and collected in the cold trap was found to contain 0.19 part of active oxygen, all present as $H_2O_2$.

In the experiments of the above examples, the heat-treated phosphorus pentoxide reacted smoothly and quietly with the other reactants, whether or not it was supplied incrementally. In contrast, ordinary commercial phosphorus pentoxide reacts violently and dangerously when added even in very small increments to either water or aqueous hydrogen peroxide, making its use impractical.

The proportions of $P_2O_5$, $H_2O_2$ and $H_2O$ employed in carrying out the reaction are not critical although it will generally be most practical to employ at least 2 moles of $H_2O_2$ and at least 1 mole of $H_2O$ per mole of $P_2O_5$ used. Mole proportions of 1.5 to 15 moles of $H_2O_2$ and of 0.5 to 6 moles of $H_2O$ per mole of $P_2O_5$ are generally operable, the preferred proportions being 2 to 5 moles of $H_2O_2$ and 1 to 4 moles of water per mole of $P_2O_5$. The $H_2O_2$ and $H_2O$ requirements are most conveniently supplied in the form of an aqueous solution of hydrogen peroxide containing 50 to 90% of $H_2O_2$.

The reaction will be carried out at temperatures below about 50° C. since at about 50° C. or higher, little, if any, of the peracid is formed. The most practical temperatures are in the range of about 10° C. to 30° C. Temperatures below 10° C., e.g. as low as about 0° C. can be used but no practical advantages result from their use. Pressure is not an important factor. Operation at about atmospheric pressure is preferred because of the convenience of doing so, but higher or lower pressures can be used.

The time required to complete the reaction will depend somewhat upon the proportions of reactants and the temperature used. When using the reactants in the preferred proportions under preferred temperature conditions, a reaction period of 1 to 90 hours is effective, but periods of 5 to 20 hours will most generally be used. Agitation of the reaction mixture during the reaction is advantageous.

Separation of the monoperphosphoric acid from the reaction mixture is generally not practical. For many uses the crude reaction mixture containing the peracid can be used effectively. However, since the stability of the peracid is adversely affected by the presence of unreacted hydrogen peroxide, it will be generally advantageous to remove unreacted hydrogen peroxide from the final reaction mixture, particularly if the product is to be stored for any considerable time before actual use. Destruction of unreacted hydrogen peroxide can be effected electrolytically or by treatment with platinum sponge. However, it has been found that unreacted hydrogen peroxide can be more effectively removed without substantial decomposition of the peracid occurring by subjecting the reaction mixture to vacuum stripping at a temperature not exceeding about 50° C., preferably not exceeding 30° C. Stripping out the $H_2O_2$ in this manner leaves as a residue a mixture of monoperphosphoric acid, orthophosphoric acid and condensed oxyacids of phosphorus. This residue is quite stable at ordinary temperatures, particularly when diluted, e. g. with 20 to 100 parts of water.

The monoperphosphoric acid is more stable in dilute than in concentrated aqueous solutions. In dilute solutions, e. g. about 1 to 2%, it is quite stable at room temperature but is slowly hydrolyzed to hydrogen peroxide and orthophosphoric acid. At 60° C., the hydrolysis is much faster and is accompanied by decomposition of the hydrogen peroxide formed. Alkaline solutions, e. g. at pH 10.5, of the sodium salt of the peracid are less stable than acid solutions, but no evidence of hydrolysis was observed.

The product monoperphosphoric acid is a true percompound in which the active oxygen is contained in a P—O—O—H group rather than in a hydrogen peroxide molecule in loose combination with the phosphate molecule as in the case of the so-called phosphate perhydrates. The above peracid is a stronger oxidizing agent than hydrogen peroxide or the phosphate perhydrates. It will oxidize manganous ions to permanganate ions whereas hydrogen peroxide and the perhydrates reduce permanganate ion to manganous ions. This last reaction is the basis for the well-known permanganate method for determining hydrogen peroxide.

Peroxygen compounds such as hydrogen peroxide are widely used for bleaching textiles, wood pulps, fats, oils and other materials. They are also used in carrying out chemical reactions where they may serve as a reactant or as a reaction catalyst, e. g. in various polymerization reactions. The monoperphosphoric acid obtained by the present method can be employed in place of hydrogen peroxide in many of the above uses, e. g. for bleaching or oxidizing purposes, particularly when its stronger oxidizing properties would be desirable.

I claim:

1. In a method for producing monoperphosphoric acid by reacting aqueous hydrogen peroxide with phosphorus pentoxide, the improvement comprising heating a highly reactive phosphorus pentoxide to a temperature sufficiently elevated and for a time sufficiently long to decrease substantially its reactivity towards aqueous hydrogen peroxide, and reacting the so heated phosphorus pentoxide with aqueous hydrogen peroxide to produce said monoperphosphoric acid.

2. The method of claim 1 wherein unreacted hydrogen peroxide is stripped from the final reaction mixture by vacuum distillation at a temperature not exceeding 50° C.

3. In a method for producing monoperphosphoric acid by reacting aqueous hydrogen peroxide with phosphorus pentoxide, the improvement comprising employing as a reactant phosphorus pentoxide which has been heated at 350 to 700° C. to effect a substantial reduction in its reactivity.

4. The method of claim 3 wherein the temperature is 400 to 550° C.

5. The method of claim 3 wherein unreacted hydrogen peroxide is stripped from the final reaction mixture by vacuum distillation at a temperature not exceeding 50° C.

6. The method of claim 4 wherein unreacted hydrogen peroxide is stripped from the final reaction mixture by vacuum distillation at a temperature not exceeding about 30° C.

No references cited.